United States Patent
Averdiek et al.

(10) Patent No.: US 7,506,715 B2
(45) Date of Patent: Mar. 24, 2009

(54) SAFETY DEVICE FOR A MOTOR VEHICLE INCLUDING A FRONT-END STRUCTURE

(75) Inventors: Reinhard Averdiek, Sindelfingen (DE); Dietmar Breitling, Wildberg (DE); Ferdinand Gaiser, Simmozheim (DE); Joachim Herre, Tuebingen (DE); Uwe Krempels, Boeblingen (DE); Richard Krueger, Weil der Stadt (DE); Bengt Larsson, Sindelfingen (DE); Christoph Mueller, Sindelfingen (DE); Michael Piesche, Jettingen (DE); Klaus Riehle, Bodelshausen (DE); Axel Schmidt, Filderstadt (DE); Alfred Schnabel, Althengstett (DE)

(73) Assignee: Daimler AG, Stuttgart (DE)

( * ) Notice: Subject to any disclaimer, the term of this patent is extended or adjusted under 35 U.S.C. 154(b) by 228 days.

(21) Appl. No.: 10/553,269

(22) PCT Filed: Feb. 21, 2004

(86) PCT No.: PCT/EP2004/001731

§ 371 (c)(1),
(2), (4) Date: Oct. 10, 2006

(87) PCT Pub. No.: WO2004/089710

PCT Pub. Date: Oct. 21, 2004

(65) Prior Publication Data

US 2007/0051550 A1    Mar. 8, 2007

(30) Foreign Application Priority Data

Apr. 12, 2003 (DE) ................. 103 16 952

(51) Int. Cl.
*B60K 28/10* (2006.01)
(52) U.S. Cl. ..................... 180/274; 180/232

(58) Field of Classification Search ............... 180/274, 180/275, 276, 232; 280/784; 74/512, 560
See application file for complete search history.

(56) References Cited

U.S. PATENT DOCUMENTS

| 5,890,358 A | 4/1999 | Verbo et al. |
| 6,041,674 A | 3/2000 | Kato |
| 6,112,616 A * | 9/2000 | Schonlau et al. ............... 74/512 |

(Continued)

FOREIGN PATENT DOCUMENTS

DE    197 57 832    7/1998

(Continued)

OTHER PUBLICATIONS

Patent Abstract of Japan, vol. 1999, No. 03, Mar. 31, 1999.

*Primary Examiner*—John Q. Nguyen
*Assistant Examiner*—Joseph Rocca
(74) *Attorney, Agent, or Firm*—Kenyon & Kenyon LLP

(57) ABSTRACT

A safety device for a motor vehicle including a front-end structure, a front bulkhead, which separates the front-end structure from an interior, and a brake apparatus fixed to the front bulkhead and including a brake cylinder, the brake cylinder includes a device for pivoting the brake apparatus, which device, in the event of a vehicle crash, interacts with structural elements disposed in the front-end structure. The safety of a driver present in the motor vehicle may be increased. The device for pivoting the brake apparatus includes a fastening portion and a slide portion with a slide plane.

11 Claims, 2 Drawing Sheets

U.S. PATENT DOCUMENTS

| | | |
|---|---|---|
| 6,269,900 B1 | 8/2001 | Adams et al. |
| 7,337,868 B2 * | 3/2008 | Mueller ................ 180/274 |
| 2006/0201150 A1 * | 9/2006 | Mueller ................ 60/533 |

FOREIGN PATENT DOCUMENTS

| | | |
|---|---|---|
| DE | 198 39 521 | 3/2000 |
| EP | 0 907 536 | 4/1999 |
| EP | 1122132 A1 * | 8/2001 |
| FR | 2 750 103 | 12/1997 |
| GB | 2 230 493 | 10/1990 |
| JP | 10-338 167 | 12/1998 |

* cited by examiner ical forced guidance device is provided, which interact with a supporting attachment disposed on a brake cylinder of the brake apparatus. In the event of a vehicle crash in which the front end is deformed, the mechanical forced guidance device is displaced in the direction of the brake apparatus. If the deformation is great enough, the mechanical forced guidance device acts upon the supporting flange on the brake cylinder and brings about a purposeful pivot motion of the brake apparatus. The brake apparatus is connected to brake pedals protruding into the interior. Through the pivoting of the brake apparatus, the brake pedals are swung out of the foot well.

SAFETY DEVICE FOR A MOTOR VEHICLE INCLUDING A FRONT-END STRUCTURE

FIELD OF THE INVENTION

The present invention relates to a safety device for a motor vehicle, which may include a front-end structure, a front bulkhead, which separates the front-end structure from an interior, and a brake apparatus fixed to the front bulkhead and which may include a brake cylinder.

BACKGROUND INFORMATION

In German Published Patent Application No. 198 39 521, a safety device for a motor vehicle including a front-end structure and a front bulkhead, which separates the front-end structure from an interior, is described. Fixed to the front bulkhead is a brake apparatus including a brake cylinder. In the front end, furthermore, on the body shell structure, a mechanical forced guidance device is provided, which interact with a supporting attachment disposed on a brake cylinder of the brake apparatus. In the event of a vehicle crash in which the front end is deformed, the mechanical forced guidance device is displaced in the direction of the brake apparatus. If the deformation is great enough, the mechanical forced guidance device acts upon the supporting flange on the brake cylinder and brings about a purposeful pivot motion of the brake apparatus. The brake apparatus is connected to brake pedals protruding into the interior. Through the pivoting of the brake apparatus, the brake pedals are swung out of the foot well.

It is additionally conventional to provide structural elements and assemblies disposed in the front-end structure, such as, for example, an engine, with special forced guidance device assigned to the brake apparatus. To this end, reference is made, for example, to Japanese Published Patent Application No. 10-338167. From this, it is also conventional to provide the brake cylinder of a brake apparatus with a device for pivoting the brake apparatus, which, in the event of a vehicle crash, interacts with structural elements disposed in the front-end structure.

SUMMARY

An example embodiment of the present invention may provide a safety device for a motor vehicle including a front-end structure, a front bulkhead, and a brake apparatus fixed to the front bulkhead, by which the injury risk for a driver of the motor vehicle in the foot region may be reduced by a simple arrangement in the event of a vehicle crash.

An example embodiment of the present invention may include a brake apparatus fixed to the front bulkhead and having a brake cylinder, the brake cylinder having a device for pivoting the brake apparatus which includes a fastening portion and a slide portion with a slide plane. By the fastening portion, the slide portion may be easily connected to the brake cylinder. In the event of a vehicle crash in which the front-end structure is deformed, the slide plane interacts with structural elements disposed in the front-end structure. Through suitable alignment of the slide plane, the interaction of these structural elements disposed in the front end brings about a tilting motion of the brake apparatus. This tilting motion causes the pedals connected to the brake apparatus and protruding into the interior to swing out. An injury risk for the driver of the vehicle in the foot region may thereby be reduced.

The device for pivoting the brake apparatus are assigned to the, in the direction of travel, forward-pointing end face of the brake cylinder. As a result, the slide portion protrudes relatively far into the front-end structure, whereby the brake apparatus plays an early part in deforming the front-end structure through the previously described tilting motion. As a result of this early involvement in the front-end deformation, the brake apparatus may cover relatively large swivel angles, allowing the brake pedal to be reliably swung out from the foot well.

The device for pivoting the brake apparatus may be detachably connected to the main brake cylinder. This may provide that different peaks may be provided according to vehicle model or depending on whether the model in question is a right-hand or left-hand drive. In addition, it may allow already installed brake apparatuses to be easily upgraded. Added to this is that, in the case of a multipart construction, there may be a free choice of material, so that the material for the device for pivoting the brake apparatus may be chosen independently from the material for the brake cylinder. It is also possible to realize the device for pivoting the brake apparatus in one part with the brake cylinder, which, in turn, may yield benefits in terms of manufacturing costs, since, in place of two separate structural elements, a single structural element may need to be made.

The slide plane may be aligned such that the brake apparatus, in the event of a vehicle crash, performs a swivel motion about a substantially horizontal axis. This swivel motion may ensure that the brake pedal may be reliably swung out from the foot well of the interior of the motor vehicle.

The slide portion may include four faces arranged in a certain manner one relative to the other, one face of which forms the slide plane. These faces may enclose a cavity. This arrangement may provide the feature, in comparison to solid structural elements, of lower weight. Through the use of a plurality of faces, the stability of the structural element may be considerably increased. The four faces may be arranged, for example, such that, in a longitudinal section in the vertical direction of the vehicle, they have a triangular cross-section, one corner of which is aligned downward.

It is possible that at least one of the faces of the slide portion has a downwardly increasing wall thickness. This may be conditioned by production engineering factors if the slide portion, for example, is realized as a casting. It also, however, may provide additional advantages with respect to the stability, e.g., of the slide plane.

In the cavity, a device may be provided for the drainage of liquids, such as, for example, a discharge opening. This may provide the advantage that, for example, cleaning agents used in an engine wash, which might have collected in the cavity, may easily run away.

The fastening portion of the device for pivoting the brake apparatus may have receiving fixtures for fastening devices, such as bores, for example. By these bores, a connection between the device for pivoting the brake apparatus and the brake cylinder is able to be established in, e.g., a particularly cheap and simple manner by fastening devices.

According to an example embodiment of the present invention, a safety device for a motor vehicle includes: a front-end structure; a front bulkhead separating the front-end structure from an interior; and a brake apparatus fixed to the front bulkhead and including a brake cylinder, the brake cylinder including a pivot device adapted to pivot the brake apparatus and to interact, in an event of a vehicle crash, with structural elements arranged in the front-end structure, the pivot device including a fastening portion and a slide portion having a slide plane.

The pivot device may be arranged at, in a direction of travel, a forward-pointing end face of the brake cylinder.

The pivot device may be detachably connected to the brake cylinder.

The slide plane may be aligned so that the brake apparatus, in the event of the vehicle crash, performs a swivel motion about a substantially horizontal plane.

The slide portion may include four faces forming a cavity, one face of the four faces forming the slide plane.

The cavity, in a longitudinal section in a vertical direction of the motor vehicle, may have a triangular cross-section, one corner of the triangular cross-section aligned downwardly.

At least one of the four faces of the slide portion may include a downwardly increasing wall thickness.

The cavity may include a discharge opening.

The fastening portion may include reception fixtures for fastening devices.

According to an example embodiment of the present invention, a safety device for a motor vehicle includes: a front-end structure; a front bulkhead separating the front-end structure from an interior; and a brake apparatus fixed to the front bulkhead and including a brake cylinder, the brake cylinder including means for pivoting the brake apparatus and for interacting, in an event of a vehicle crash, with structural elements arranged in the front-end structure, the means including a fastening portion and a slide portion having a slide plane.

According to an example embodiment of the present invention, a motor vehicle includes: a safety device, including: a front-end structure; a front bulkhead separating the front-end structure from an interior; and a brake apparatus fixed to the front bulkhead and including a brake cylinder, the brake cylinder including a pivot device adapted to pivot the brake apparatus and to interact, in an event of a vehicle crash, with structural elements arranged in the front-end structure, the pivot device including a fastening portion and a slide portion having a slide plane.

Example embodiments of the present invention are explained in greater detail below with reference to the appended Figures.

DETAILED DESCRIPTION

Figure 1:
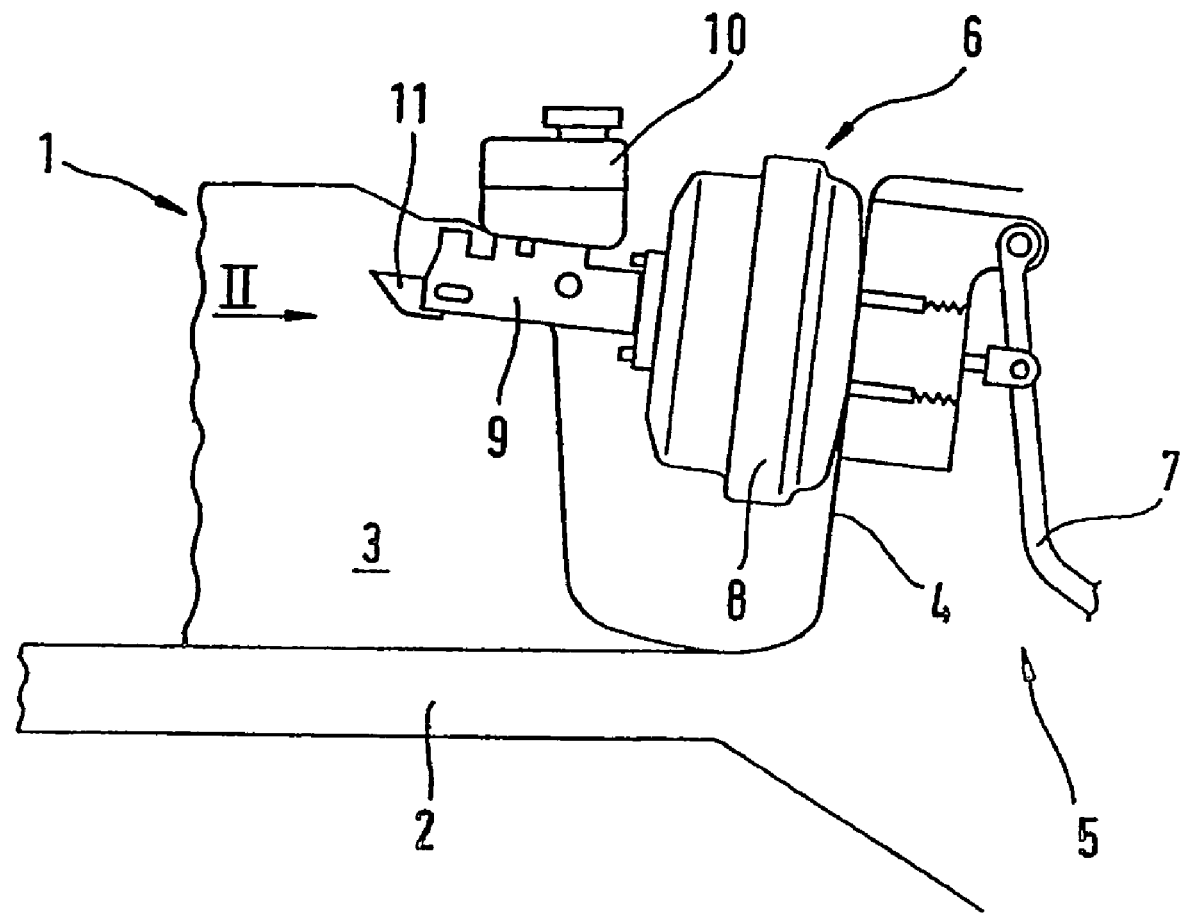
FIG. 1 is a schematic side view of an example embodiment of a safety device for a motor vehicle including a front-end structure.

A passenger vehicle has, e.g., in a conventional manner, a front-end structure 1 which has as body shell parts, inter alia, two front-end longitudinal members 2 and, for each vehicle side, respectively a spring strut bracket 3 or a wheel housing. The front-end longitudinal members 2 merge into a front bulkhead 4, which forms the termination of the front-end structure 1 in the direction of the passenger compartment and the vehicle interior. Protruding into a foot well 5 of the vehicle interior, e.g., in a conventional manner, is a brake pedal 7, which is coupled to a brake apparatus 6. The brake apparatus 6 is fixed to the front bulkhead 4.

The front-end structure 1 bounds a front-end space, which in vehicles with a front engine constitutes an engine compartment and in vehicles with rear engine or in vehicles with a centrally placed engine constitutes a trunk or loading space.

The brake apparatus 6 is fixed to the front bulkhead 4 such that a brake booster 8 is located on that side of the front bulkhead 4 which faces toward the front-end space, i.e., the engine compartment or the trunk or loading space. To the front in the longitudinal direction of the vehicle, the brake booster 8 is adjoined by a main brake cylinder 9, which is part of the brake apparatus 6. Above the main brake cylinder 9, a pressure medium reservoir 10 be placed in a conventional manner.

In a front end face region of the brake apparatus 6, in the illustrated example embodiment in a front end face region of the brake cylinder 9, a device 11 for pivoting the brake apparatus 6 is provided on a housing of the brake cylinder 9. This device 11 is described in greater detail below with reference to FIGS. 2 to 5.

Figure 2:
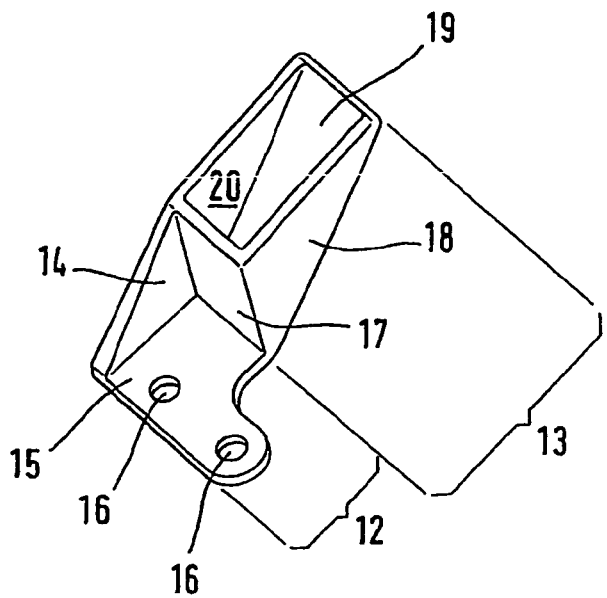
FIG. 2 is a perspective view of a device for pivoting a brake apparatus.

In FIG. 2, a device 11 for pivoting the brake apparatus 6 is illustrated in perspective view. The device 11 has a fastening portion 12 and a slide portion 13. The fastening portion 12 includes two faces 14 and 15, aligned substantially at right angles to each other. In the face 15 there are made two bores 16 for the reception of fastening devices.

The slide portion 13 includes four faces 14, 17, 18 and 19. The face 19 is arranged in extension of the face 15 of the fastening portion and forms a slide plane. The face 14 corresponds to the face 14 to be assigned to the fastening portion 12. The face 18 is arranged parallel to the face 14. Extending between these two faces is the face 17. The faces 14, 17, 18 and 19 enclose a cavity 20. This cavity 20 has a triangular cross-section, one corner of which borders on the fastening portion 12, in particular on the face 15 thereof. In the installed state, the device 11 for pivoting the brake apparatus is arranged such that the slide plane 19 points forward in the direction of travel, the face 17 is assigned to the brake cylinder 9. The device 11 is connected by the fastening portion 12 to the brake cylinder 9. The cavity 20 is thus open to the top.

Figure 3:
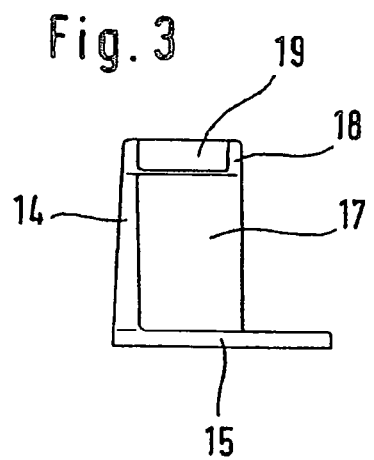
FIG. 3 is a side view of the device illustrated in FIG. 2 from the side facing toward a brake cylinder.

In FIG. 3, the device 11 is illustrated in a side view of the face 17 assigned to the brake cylinder. In addition, the two mutually parallel faces 14 and 18, and the face 19 projecting over the face 17, are discernible. The lower termination of the device 11 is formed by the face 15.

Figure 4:
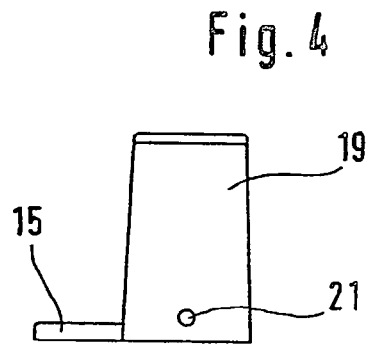
FIG. 4 is a side view of the device illustrated in FIG. 2 from the side facing away from the brake cylinder.

In FIG. 4, the device 11 is illustrated in a side view of the slide plane 19. In addition to the face 19, the face 15 is discernible, which forms the lower termination of the device 11 and projects laterally over the face 19. In addition, an end opening 21 is discernible. This end opening 21 is realized as a bore which passes through the face 19. The end opening 21 may ensure that liquids received in the cavity 20 are able to run away.

Figure 5:
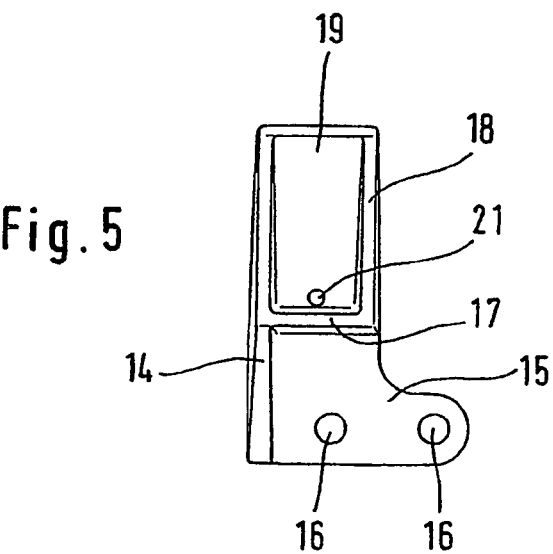
FIG. 5 is a top view of the device illustrated in FIG. 2.

FIG. 5 is a top view of the device 11. Located in the plane of the drawing is the face 15 with the two bores 16. Extending perpendicular to the plane of the drawing are the faces 14, 18 and 17. Extending obliquely to the plane of the drawing is the slide plane 19. In the slide plane 19, the discharge opening 21 is also identifiable.

It is apparent from FIG. 5 that the wall thicknesses of the faces 14, 17 and 18 increase in the downward direction. Their thickness may measure, for example, 4 mm in the upper region and 7 mm in the lower region. The slide plane 19 may be realized correspondingly. With a 7 mm thick face 15 containing the bores 16, it is possible to produce a sufficiently rigid structural element. The device 11 may be realized, for example, as a casting. The distribution of the structural element thickness may be conditioned by production engineering factors.

The operation of the safety device is described below. In the event of a vehicle crash, the front-end structure 1 is deformed such a way that the front-end longitudinal member 2 and the spring strut bracket move in the direction of the front bulkhead. Structural elements disposed in the front-end structure are thereby moved in the direction of the front bulkhead. When the deformation is sufficiently large, the moment is sometime reached at which the brake apparatus 6 collides, with the forward-pointing slide plane 19, with structural elements disposed in the front-end structure. Due to the alignment of the slide plane 19, the brake apparatus 6 is rotated about a substantially horizontal swivel axis. The brake apparatus 6 thus undergoes a tilting motion. The tilting motion, as illustrated in FIG. 1, is realized in the clockwise direction. Through this tilting motion of the brake apparatus 6, the brake pedal 7 coupled to the brake apparatus 6 is moved out of the foot well 5 forward in the direction of travel, so that injury risks for the foot region of the driver may be reduced.

In order to prevent the possibility that further buckling of the front-end structure in the longitudinal direction of the vehicle in connection with the front-end deformation during the vehicle crash might lead to rearward displacement of the brake apparatus 6, inclusive of the brake pedal 7, toward the foot well 5, the slide plane 19 may be arranged such that, from a certain swivel angle of the brake apparatus 6 relative to the front bulkhead 4, it slides off from the structural element disposed in the front-end structure and with which it interacts, with the result that no further torque is applied to the brake apparatus 6. This may ensure that the desired swiveled-back position of the brake pedal 7 is maintained and that the brake apparatus 6 no longer leads to any further rearward displacement of the brake apparatus 6 resulting from a further deformation of the front-end region.

It is also possible to realize the device 11 for pivoting the brake apparatus 6 in one piece with the brake cylinder. Fastening devices present in the brake cylinder, such as, for example, a closing screw, may be arranged such that they have a slide portion 13 having a slide plane 19.

The invention claimed is:

1. A safety device for a motor vehicle, comprising:
    a front-end structure;
    a front bulkhead separating the front-end structure from an interior; and
    a brake apparatus fixed to the front bulkhead and including a brake cylinder, the brake cylinder including a pivot device adapted to pivot the brake apparatus and to interact, in an event of a vehicle crash, with structural elements arranged in the front-end structure, the pivot device including a fastening portion and a slide portion having a slide plane;
    wherein the slide portion includes four planar faces forming a cavity.

2. The safety device according to claim 1, wherein the pivot device is arranged at, in a direction of travel, a forward-pointing end face of the brake cylinder.

3. The safety device according to claim 1, wherein the pivot device is detachably connected to the brake cylinder.

4. The safety device according to claim 1, wherein the slide plane is aligned so that the brake apparatus, in the event of the vehicle crash, performs a swivel motion about a substantially horizontal plane.

5. The safety device according to claim 1, wherein one face of the four planar faces forms the slide plane.

6. The safety device according to claim 1, wherein the cavity, in a longitudinal section in a vertical direction of the motor vehicle, has a triangular cross-section, one corner of the triangular cross-section aligned downwardly.

7. The safety device according to claim 1, wherein at least one of the four planar faces of the slide portion includes a downwardly increasing wall thickness.

8. The safety device according to claim 1, wherein the cavity includes a discharge opening.

9. The safety device according to claim 1, wherein the fastening portion includes reception fixtures for fastening devices.

10. A safety device for a motor vehicle, comprising:
    a front-end structure;
    a front bulkhead separating the front-end structure from an interior; and
    a brake apparatus fixed to the front bulkhead and including a brake cylinder, the brake cylinder including means for pivoting the brake apparatus and for interacting, in an event of a vehicle crash, with structural elements arranged in the front-end structure, the means including a fastening portion and a slide portion having a slide plane;
    wherein the slide portion includes four planar faces forming a cavity.

11. A motor vehicle, comprising:
    a safety device, including:
        a front-end structure;
        a front bulkhead separating the front-end structure from an interior; and
        a brake apparatus fixed to the front bulkhead and including a brake cylinder, the brake cylinder including a pivot device adapted to pivot the brake apparatus and to interact, in an event of a vehicle crash, with structural elements arranged in the front-end structure, the pivot device including a fastening portion and a slide portion having a slide plane;
        wherein the slide portion includes four planar faces forming a cavity.

* * * * *